United States Patent [19]
Noll et al.

[11] Patent Number: 5,337,386
[45] Date of Patent: Aug. 9, 1994

[54] SINGLE CHANNEL SNAP-LOCK FIBER OPTIC CONNECTOR

[75] Inventors: Gregory B. Noll, Riverside; Jack J. Maranto, Capistrano Beach; Louis F. Kardos, Fountain Valley, all of Calif.

[73] Assignee: Hughes Aircraft Company, Los Angeles, Calif.

[21] Appl. No.: 994,842

[22] Filed: Dec. 22, 1992

[51] Int. Cl.⁵ .............................. G02B 6/38
[52] U.S. Cl. ........................ 385/60; 385/75
[58] Field of Search ............ 385/53, 55, 56, 58, 385/59, 60, 70, 71, 75

[56] References Cited

U.S. PATENT DOCUMENTS

| | | | |
|---|---|---|---|
| 4,225,214 | 9/1980 | Hodge et al. | 385/68 |
| 4,240,695 | 12/1980 | Evans | 385/66 |
| 4,268,115 | 5/1981 | Slemon et al. | 385/92 |
| 4,747,656 | 5/1988 | Miyahara et al. | 385/75 |
| 4,756,595 | 7/1988 | Braun et al. | 385/75 |
| 4,872,736 | 10/1989 | Myers et al. | 385/60 |
| 5,125,056 | 6/1992 | Hughes et al. | 385/59 |

*Primary Examiner*—Frank Gonzalez
*Attorney, Agent, or Firm*—Elizabeth E. Leitereg; Terje Gudmestad; W. K. Denson-Low

[57] ABSTRACT

A fiber optic connector (11) for interconnecting a fiber optic pin terminus (19) and a fiber optic socket terminus (17) which includes a receptacle connector body (13) and a plug connector body (15). The receptacle connector body (13) has a passage (21) extending through it which is sized and adapted to receive the fiber optic socket terminus (17). The plug connector body (15) has a passage (39) extending through it which is sized and adapted to receive the fiber optic pin terminus (19). An end portion of one of the bodies is receivable in the passage of an end portion of the other of the bodies to define an interconnected position which is adapted to optically couple the socket terminus (17) and the pin terminus (19). A lock on the bodies is responsive to the bodies being in the interconnected position to lock the bodies in the interconnected position. The lock is also responsive to a pulling force of at least a first magnitude to unlock and allow the bodies to separate.

20 Claims, 2 Drawing Sheets

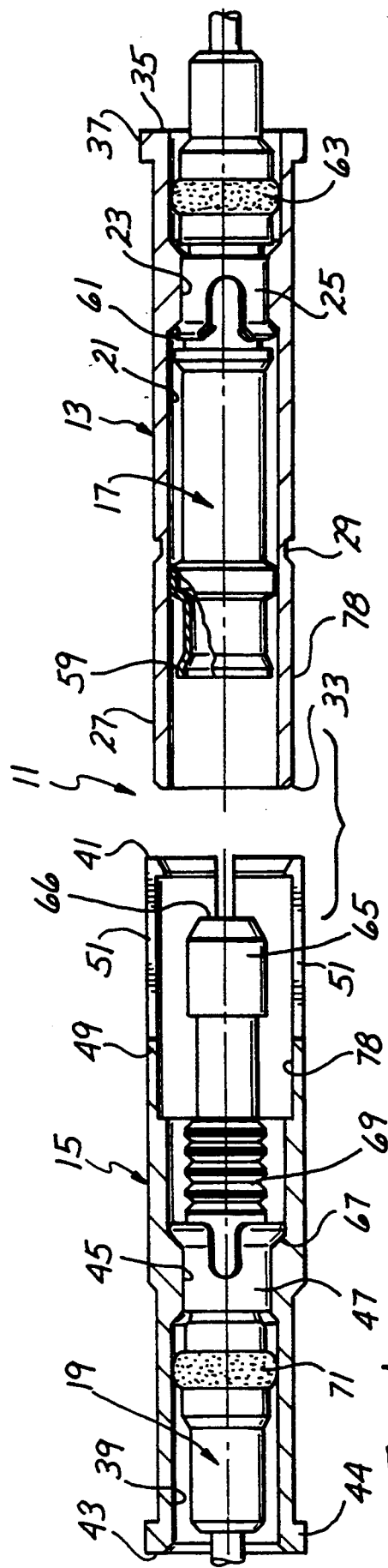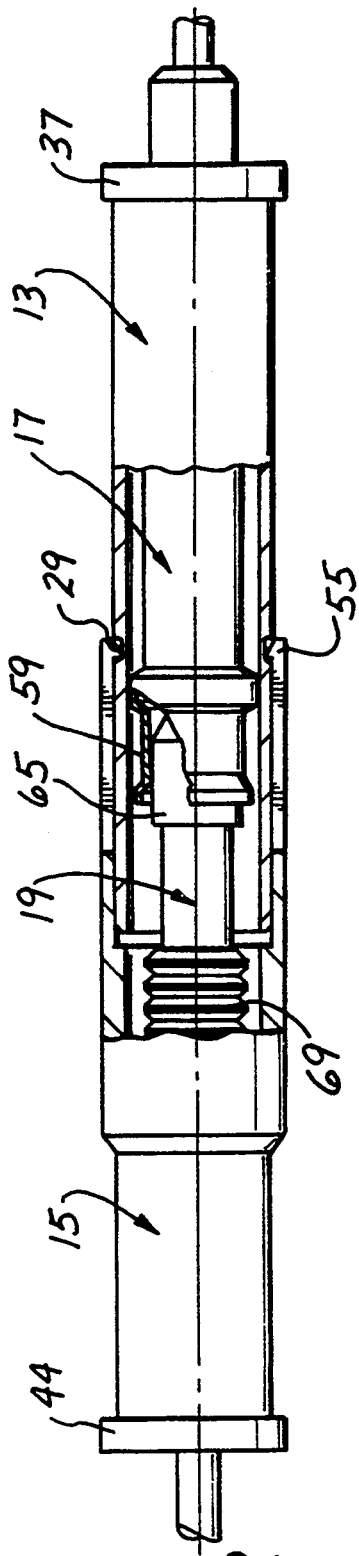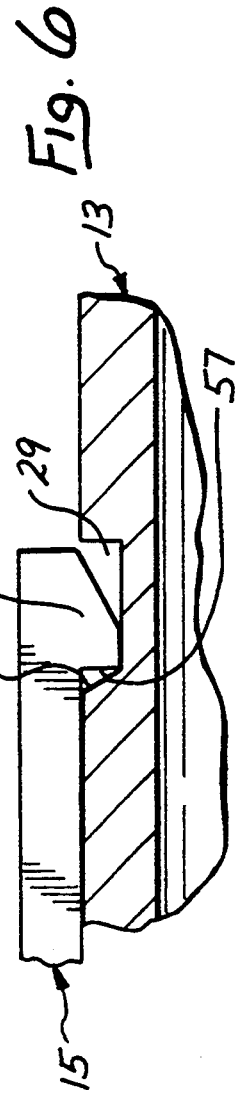

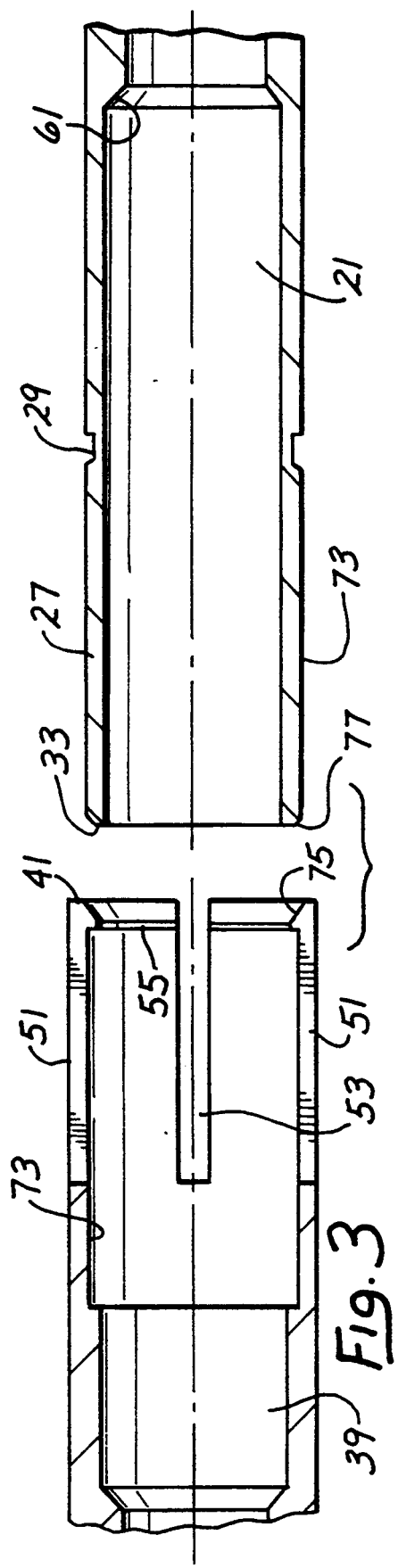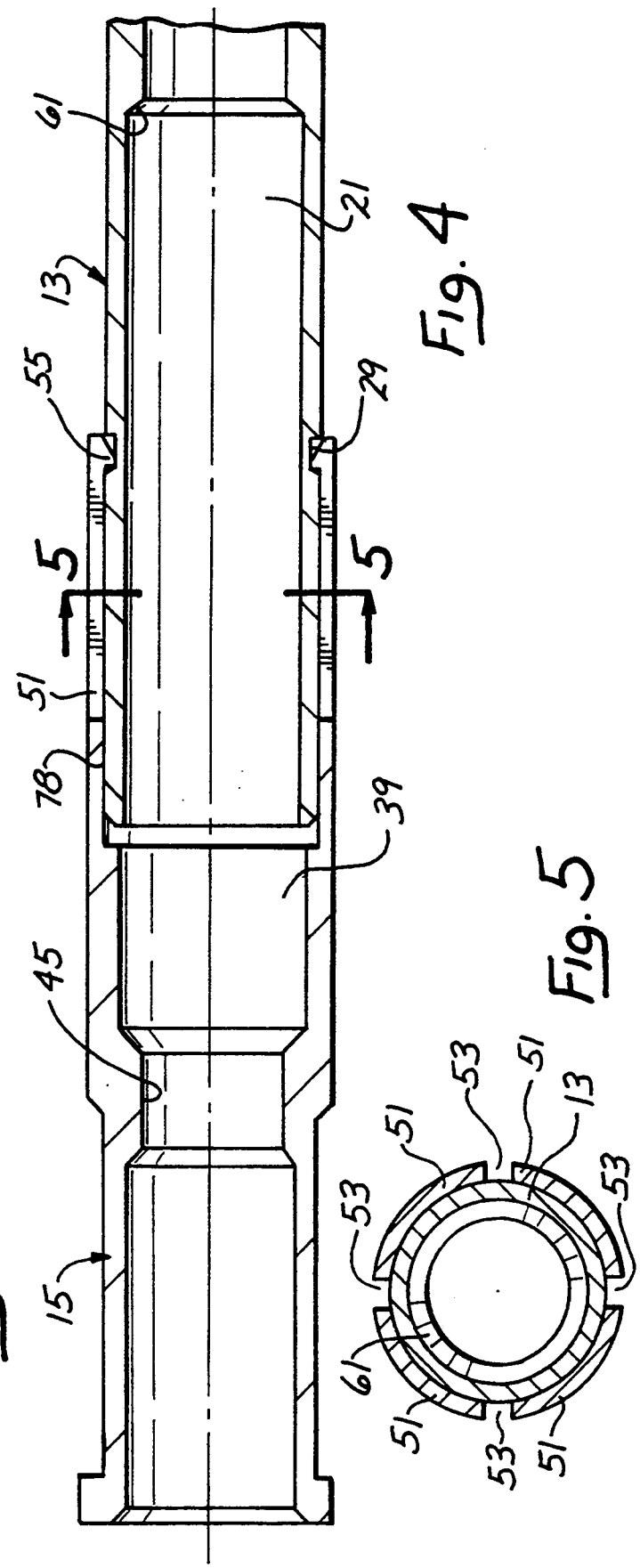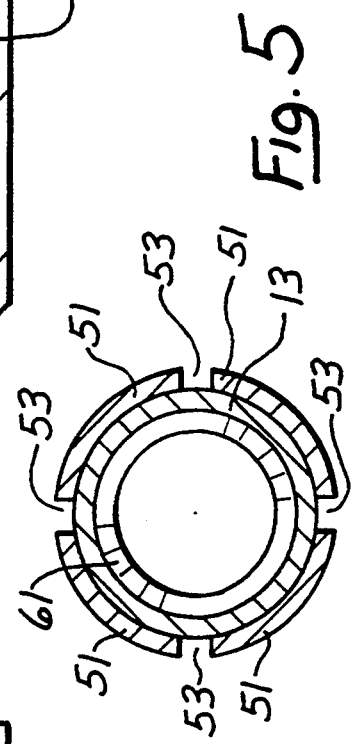

SINGLE CHANNEL SNAP-LOCK FIBER OPTIC CONNECTOR

BACKGROUND OF THE INVENTION

1. Field of the Invention

This invention relates to a fiber optic connector for interconnecting a fiber optic pin terminus and a fiber optic socket terminus. More specifically, this invention relates to a fiber optic connector which can be interconnected by pushing two connector bodies together and can be disconnected by pulling the connector bodies apart.

2. Description of Related Art

It is often necessary or desirable to optically couple two or more optical fibers. To accomplish this, one of the optical fibers is mounted in a fiber optic pin terminus and another of the fibers is mounted in a fiber optic socket terminus. These termini are constructed so that an end portion of the socket terminus can receive an end portion of the pin terminus to thereby optically couple the optical fibers carried by the termini. A fiber optic connector is utilized to hold or lock the termini in the interconnected position with the optical fibers optically coupled.

Different forms of fiber optic connectors are known. For example, one kind of fiber optic connector includes components which are threaded together to thereby connect the termini and optically couple the optical fibers. Another type of fiber optic connector utilizes a spring loaded bayonet coupling to couple the termini together. Although these prior art connectors are satisfactory for a number of applications, there are situations in which it is desirable to have a fiber optic connector with smaller dimensions and less mass than is reasonably possible with either of these prior art connectors.

SUMMARY OF THE INVENTION

This invention provides a fiber optic connector having the desired relatively small dimensions and reduced mass. In addition, the fiber optic connector of this invention can be easily engaged and disengaged.

The fiber optic connector preferably includes a receptacle connector body having a passage extending therethrough sized and adapted to receive a fiber optic socket terminus and a plug connector body having a passage extending therethrough sized and adapted to receive a fiber optic pin terminus. The end portion of one of the bodies is receivable in the passage of an end portion of the other of the bodies to define an interconnected position which is adapted to optically couple the socket terminus and the pin terminus.

A lock on the bodies is responsive to the bodies being in the interconnected position to lock the bodies in such position. The lock is also responsive to a pulling force of at least a first magnitude to unlock and allow the bodies to separate. Thus, the lock is quickly and easily operable and it does not require relatively large dimensions.

Although either of the bodies may receive the end portion of the other, preferably an end portion of the receptacle connector body is receivable in the passage of an end portion of the plug connector body.

The lock preferably includes a locking component on each of the bodies. In a preferred construction, the lock includes a locking groove on one of the bodies and a retaining shoulder on the other of the bodies. One advantage of this construction is that it does not require a large cross section to provide the lock. Preferably the locking groove is on the end portion of the body which is received within the passage of the end portion of the other body.

To provide for rapid coupling of the connector bodies and for minimal cross sectional dimensions, the end portion of the receiving body preferably includes a plurality of spring fingers and the retaining shoulder is on the spring fingers. It is desirable for the locking groove and the retaining shoulder to have cooperating retaining surfaces which serve to lock the connector bodies in the interconnected position. To facilitate separation of the connector bodies in response to a pulling force, at least one of the retaining surfaces is preferably inclined. External gripping shoulders may be provided adjacent distal ends of the connector bodies to facilitate application of the pulling force.

The connector bodies can advantageously include cooperating guiding surfaces on their end portions for axially aligning the bodies. In a preferred construction, one of the guide surfaces is on the exterior surface of one of the connector bodies adjacent the proximal end thereof and the other guide surface is on the interior surface of the other connector body and is spaced from the proximal end thereof.

When the receptacle connector body and the plug connector body are provided with a socket terminus and a pin terminus, respectively, they retain such terminus in the associated passage and the fiber optic connector-termini assembly then constitutes a fiber optic connector assembly. This assembly includes a resilient member on one of the termini for biasing the retaining shoulder against the retaining surface of the groove. Another advantage of this invention is that both the pin terminus and socket terminus may be conventional termini and so the fiber optic connector is usable with conventional termini.

The invention, together with additional features and advantages thereof may best be understood by reference to the following description taken in connection with the accompanying illustrative drawings.

BRIEF DESCRIPTION OF THE DRAWINGS

In the accompanying drawings:

FIG. 1 is a side elevational view partially in section of a fiber optic connector assembly in a disconnected position.

FIG. 2 is a view similar to FIG. 1 of the fiber optic connector assembly in the interconnected position.

FIG. 3 is an enlarged fragmentary sectional view taken on an axial plane through portions of the connector bodies with the connector bodies in a disconnected position.

FIG. 4 is a view similar to FIG. 3 with the connector bodies in the interconnected position.

FIG. 5 is a sectional view taken generally along line 5—5 of FIG. 4.

FIG. 6 is an enlarged fragmentary sectional view illustrating one form of locking groove and retaining shoulder.

DESCRIPTION OF THE PREFERRED EMBODIMENT

FIGS. 1 and 2 show a fiber optic connector assembly 11 which generally comprises a receptacle connector body 13, a plug connector body 15, a fiber optic socket terminus 17 carried by the receptacle connector body and a fiber optic pin terminus 19 carried by the plug connector body. The receptacle connector body 13 and the plug connector body 15 can be interconnected as shown in FIG. 2 to mechanically interconnect the connector bodies and to optically couple the termini 17 and 19. More particularly, the termini 17 and 19 carry optical fibers (not shown) which are optically coupled in the interconnected position of FIG. 2.

The receptacle connector body 13 is generally cylindrical, elongated and has an axial passage 21 extending completely through it which is sized and adapted to receive the fiber optic socket terminus 17. More specifically, the axial passage 21 has a wall portion 23 which frictionally grips a retaining clip 25 of the socket terminus 17.

The receptacle connector body 13 has an end portion 27 and an annular locking groove 29 is formed in the end portion 27. As shown in FIG. 6, the locking groove 29 has a retaining surface 31 which is inclined axially toward a proximal end 33 of the receptacle connector body 13 as the retaining surface 33 extends radially outwardly. The receptacle connector body 13 has a distal end 35 and an annular external gripping shoulder 37 at the distal end.

Although various materials can be used to construct the receptacle body 13, a metal is preferred. The material of the receptacle connector body 13 should be resistant to cold flow and stainless steel and brass are examples of materials that can be employed.

The plug connector body 15 is also generally cylindrical and elongated and has an axial passage 39 extending completely through it from a proximal end 41 to a distal end 43. An annular external gripping shoulder 44 is provided at the distal end 43. The plug connector body 15 is sized and adapted to receive the fiber optic pin terminus 19, and for this purpose has a wall portion 45 adapted to frictional grip a retaining clip 47 of the pin terminus 19.

The plug connector body 15 has an end portion 49 and a plurality (four being illustrated) of identical, generally axially extending and circumferentially spaced spring fingers 51 which terminate at the proximal end 41. Adjacent spring fingers 51 are circumferentially separated by axially extending slots 53 (FIGS. 3 and 5). The spring fingers 51 are curved in radial cross section as shown in FIG. 5. A retaining shoulder 55 is provided on the spring fingers 51 closely adjacent the proximal end 41. The retaining shoulder 55 extends radially inwardly and is interrupted by the slots 53. But for the slots 53, the shoulder 55 would form a continuous ring. As shown more clearly in FIG. 6, the retaining shoulder 55 has a retaining surface 57 which, in the interconnected position of FIG. 6, confronts the retaining surface 31 of the locking groove 29. The retaining surface 57 in this embodiment lies in a radial plane.

The plug connector body 15 is preferably constructed of a metal and at least the spring fingers 51 and preferably the entire body 15 is constructed of a metal having spring qualities so as to impart the desired resilience to the fingers 51. In the regard, the fingers 51 should be capable of being resiliently biased radially outwardly from the position shown in FIG. 3 to allow interconnection of the bodies 13 and 15. For example, the plug connector body 15 may be constructed of stainless steel or nickel plated beryllium-copper.

The termini 17 and 19 are preferably conventional termini used for optically coupling optical fibers, and because these termini are conventional, they are not described in great detail herein. The socket terminus 17 has a socket 59 at its proximal end and the retaining clip 25 bears against an internal shoulder 61 in the passage 21. An optical fiber (not shown) is carried by the terminus 17 in a conventional manner and terminates at the bottom (or right end as viewed in FIG. 1) of the socket 59. An annular resilient seal 63 seals the interface between the wall of the passage 21 and the socket terminus 19.

Similarly, the pin terminus 19 has a guide bushing 65 with a flat end face 66, and the guide bushing is sized to be received within the socket 59 of the socket terminus 17 in a conventional manner. An optical fiber (not shown) is carried by the terminus 19 in a conventional manner and terminates substantially flush with the end face 66. The retaining clip 47 bears against an internal shoulder 67 in the passage 39 of the plug connector body 15 and a Belleville spring 69 resiliently urges the guide bushing 65 to the right as viewed in FIG. 1, i.e. toward the proximal end 41. A resilient annular seal 71 seals the interface between the wall of the passage 39 and the pin terminus 19.

In use, the end portion 27 of the receptacle connector body 13 is receivable in the passage 39 of the end portion 49 of the plug connector body 15 as shown in FIG. 2. As the end portion 27 enters the passage 39, cam surfaces 75 and 77 on the retaining shoulder 55 and at the proximal end 33, respectively cooperate to cam the spring fingers 51 radially outwardly over the outer surface of the end portion 27. Cooperating guide surfaces 78 are provided on the outer and inner surfaces of the end portions 27 and 49, respectively, for axially aligning the connector bodies 13 and 15. Inward movement of the end portion 27 into the passage 39 continues until the retaining shoulder 55 snaps into the locking groove 29 as shown in FIGS. 2 and 4. This defines the interconnected position, and in this position, the guide bushing 65 is received within the socket 59 as shown in FIG. 2 and the optical fibers are axially aligned, substantially engaging and optically coupled. The retaining surfaces 31 and 57 (FIG. 6) lock the connector bodies 13 and 15 in the interconnected position. Thus, the locking groove 29 and the retaining shoulder 55 form a lock. The Belleville spring 69 urges the guide bushing 65 into the socket 59 and the guide bushing bottoms out in the socket thereby applying a force to the assembly 11 which urges the retaining surfaces 31 and 57 toward each other to tightly and securely establish the position of the components in the interlocked position.

To separate the connector bodies 13 and 15 and the termini 17 and 19, the gripping shoulders 37 and 44 are gripped and a pulling force of a magnitude sufficient to cause the retaining shoulder 55 to ride up the inclined retaining surface 31 is applied. This resiliently flexes the fingers 51 radially outwardly to unlock the lock and allow axial separation of the connector bodies 13 and 15 and the termini 17 and 19.

It should be noted that the connector bodies are locked by simply pushing them together and unlocked by pulling them apart with a pulling force of a predetermined magnitude. Locking is achieved automatically in response to moving the connector bodies 13 and 15 to the interconnected position. Also, the fingers 51 with the retaining shoulder 55 and the locking groove 29 provide a lock having minimal radial dimensions. In fact, the lock does not increase the radial dimensions of the connector assembly 11. Finally, if a terminus is damaged the associated connector body 13 or 15 can be reused with a new terminus.

Although an exemplary embodiment of the invention has been shown and described, many changes, modifications and substitutions may be made by one having ordinary skill in the art without necessarily departing from the spirit and scope of this invention.

We claim:

1. A fiber optic connector for interconnecting a fiber optic pin terminus and a fiber optic socket terminus, said fiber optic connector comprising:

a receptacle connector body have a passage extending therethrough sized and adapted to receive the fiber optic socket terminus;

a plug connector body having a passage extending therethrough sized and adapted to receive the fiber optic pin terminus;

an end portion of one of said bodies being receivable in the passage of an end portion of the other of said bodies to define an interconnected position which is adapted to optically couple the socket terminus and the pin terminus; and a lock on said bodies responsive to the bodies being in the interconnected position to lock the bodies in the interconnected position and said lock when locking the bodies in the interconnected position being responsive to a pulling force of at least a first magnitude to unlock and allow said bodies to separate.

2. A fiber optic connector as defined in claim 1 wherein said one body is the receptacle connector body and said other body is the plug connector body.

3. A fiber optic connector as defined in claim 1 wherein the lock includes a locking groove on the end portion of a first of said bodies and a retaining shoulder on the end portion of a second of said bodies.

4. A fiber optic connector as defined in claim 3 wherein said end portion of said other body includes a plurality of spring fingers and one of said retaining shoulder and said locking groove is on said spring fingers.

5. A fiber optic connector as defined in claim 4 wherein the locking groove and the retaining shoulder have cooperating retaining surfaces which lock the bodies in the interconnected position, at least one of said retaining surfaces being inclined to facilitate unlocking of the lock in response to said pulling force.

6. A fiber optic connector as defined in claim 5 wherein said one body is the receptacle connector body and said other body is the plug connector body.

7. A fiber optic connector as defined in claim 6 including cooperating guide surfaces on said end portions for axially aligning said bodies.

8. A fiber optic connector as defined in claim 7 wherein said receptacle connector body has a proximal end and an exterior surface and said plug connector body has a proximal end and an internal surface defining the passage through said plug connector body, and one of the guide surfaces is on said exterior surface closely adjacent the proximal end of said receptacle connector body and another of the guide surfaces is on said interior surface spaced from the proximal end of said plug connector body.

9. A fiber optic connector as defined in claim 1 wherein each of the bodies has a distal end and an external gripping shoulder adjacent the distal end thereof to facilitate application of said pulling force.

10. A fiber optic connector as defined in claim 6 wherein said retaining shoulder is closely adjacent the proximal end of the plug connector body and at least one of the locking groove and the retaining surface on the locking groove is inclined to facilitate unlocking of the lock in response to said pulling force.

11. A fiber optic connector for interconnecting a fiber optic pin terminus and a fiber optic socket terminus, said fiber optic connector comprising:

a receptacle connector body having an axial passage extending therethrough sized and adapted to receive the fiber optic socket terminus;

said receptacle connector body having a proximal end, an exterior surface and a locking groove in the exterior surface spaced from the proximal end;

a plug connector body having an axial passage extending therethrough sized and adapted to receive the fiber optic pin terminus;

said plug connector body having a proximal end, an interior surface defining the passage in the plug connector body, a plurality of generally axially extending and circumferentially spaced spring fingers terminating at the proximal end of the plug connector body and a retaining shoulder on said spring fingers closely adjacent the proximal end of the plug connector body and extending generally radially inwardly;

an end portion of the receptacle connector body being receivable in the passage of an end portion of the plug receptacle body with the retaining shoulder being receivable in the locking groove to define an interconnected position which is adapted to optically couple the termini and in which the connector bodies are interconnected;

cooperating guide surfaces on said exterior surface of the receptacle connector body and said interior surface of said plug connector body for use in axially aligning said bodies;

said retaining shoulder being closely adjacent the proximal end of the plug connector body and at least one of the locking groove and retaining shoulder having an inclined retaining surface so that the retaining shoulder can be separated from the locking groove in response to a pulling force.

12. A fiber optic connector assembly comprising:

a fiber optic socket terminus;

a receptacle connector body having a passage extending therethrough, said socket terminus being received and retained in the passage of the receptacle connector body;

a fiber optic pin terminus;

a plug connector body having a passage extending therethrough, said pin terminus being received and retained in the passage of the plug connector body;

an end portion of one of said bodies being receivable in the passage of an end portion of the other of said bodies to define an interconnected position in which the socket terminus and the pin terminus are optically coupled; and a lock on said bodies responsive to the bodies being in the interconnected position to lock the bodies in the interconnected position and said lock when locking the bodies in the interconnected position being responsive to a pulling force of at least a first magnitude to unlock and allow said bodied to separate.

13. A fiber optic connector assembly as defined in claim 12 including cooperating guide surfaces on said end portions for axially aligning said termini.

14. A fiber optic connector assembly as defined in claim 12 said lock includes a locking component on each of said end portions of said bodies.

15. A fiber optic connector assembly as defined in claim 12 wherein said one body is the receptacle connector body and said other body is the plug connector body.

16. A fiber optic connector assembly as defined in claim 12 wherein the lock includes a locking groove on said one body and a retaining shoulder on said other body and the assembly includes a resilient member on one of said termini for biasing the retaining shoulder against a retaining surface of the groove.

17. A fiber optic connector assembly as defined in claim 16 wherein said end portion of said other body includes a plurality of spring fingers and said retaining shoulder is on said spring fingers.

18. A fiber optic connector assembly as defined in claim 17 wherein the retaining shoulder has a retaining surface which cooperates with the retaining surface of the groove to lock the bodies in the interconnected position, at least one of said retaining surfaces being inclined to facilitate unlocking of the lock in response to said pulling force.

19. A fiber optic connector assembly as defined in claim 18 wherein said one body is the receptacle connector body and said other body is the plug connector body.

20. A fiber optic connector assembly as defined in claim 19 including cooperating guide surfaces on said end portions for axially aligning said bodies.

* * * * *